(12) United States Patent
Kolich et al.

(10) Patent No.: US 7,446,153 B2
(45) Date of Patent: Nov. 4, 2008

(54) PREPARATION OF BROMINATED STYRENIC POLYMERS OR RESINS

(75) Inventors: Charles H. Kolich, Baton Rouge, LA (US); John F. Balhoff, Baton Rouge, LA (US); Martin B. Berdon, Baton Rouge, LA (US); Ronny W. Lin, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 132 days.

(21) Appl. No.: 11/612,705

(22) Filed: Dec. 19, 2006

(65) Prior Publication Data

US 2007/0149718 A1 Jun. 28, 2007

Related U.S. Application Data

(60) Provisional application No. 60/753,062, filed on Dec. 21, 2005.

(51) Int. Cl.
*C08F 8/18* (2006.01)

(52) U.S. Cl. .................. 525/355; 525/333.4; 525/356; 525/357; 525/358; 525/359.1; 525/359.2; 525/359.3; 525/359.4; 525/359.5; 525/359.6

(58) Field of Classification Search .......... 525/355, 525/356, 357, 358, 359.1, 359.2, 359.3, 359.4, 525/359.5, 359.6
See application file for complete search history.

(56) References Cited

U.S. PATENT DOCUMENTS 3,050,476 A * 8/1962 Tress et al. ............. 521/60
3,071,569 A * 1/1963 Hoerger .................. 525/358
4,143,221 A 3/1979 Naarmann et al.
4,832,873 A * 5/1989 Favstritsky et al. ......... 252/601
5,677,390 A 10/1997 Dadgar et al.
5,686,538 A 11/1997 Balhoff et al.
5,767,203 A 6/1998 Ao et al.
5,852,131 A 12/1998 Balhoff et al.
5,852,132 A 12/1998 Dadgar et al.
5,916,978 A 6/1999 Ao et al.
6,113,381 A 9/2000 Gellert et al.
6,207,765 B1 3/2001 Ao et al.
6,232,393 B1 5/2001 Dadgar et al.
6,232,408 B1 5/2001 Dadgar et al.
6,235,831 B1 5/2001 Reed et al.
6,235,844 B1 5/2001 Dadgar et al.
6,326,439 B1 12/2001 Dadgar et al.
6,521,714 B2 2/2003 Kolich et al.

FOREIGN PATENT DOCUMENTS

FR 2413408 7/1979

* cited by examiner

*Primary Examiner*—Bernard Lipman
(74) *Attorney, Agent, or Firm*—Jeremy J. Kliebert

(57) ABSTRACT

Bromination of styrenic polymer is carried out in a closed reaction system to retain HX coproduct (where HX is HBr or HCl, or both) in the bromination reaction mixture at superatmospheric pressure. Preferably, the reaction mixture which includes the brominated styrenic polymer and substantially all of the HX coproduct formed is discharged into an aqueous quenching medium. By operating in this manner, the reaction is terminated and the brominated styrenic polymer of desired bromine content and substantially all HX coproduct are captured in the same operation, process equipment costs are reduced, and processing of the reaction mixture is facilitated.

23 Claims, 1 Drawing Sheet

US 7,446,153 B2

PREPARATION OF BROMINATED STYRENIC POLYMERS OR RESINS

BACKGROUND

Commonly-owned U.S. Pat. Nos. 5,677,390, 5,686,538, 5,767,203, 5,852,131, 5,852,132, 5,916,978, 6,113,381, 6,207,765, 6,232,393, 6,232,408, 6,235,831, 6,235,844, 6,326,439, and 6,521,714 describe what is believed to be the best previously-published process technology for producing brominated styrenic polymers such as brominated polystyrene having the best properties of those of any previously-published brominated styrenic polymer. In this connection, the terms "brominated styrenic polymer" and "brominated polystyrene" as used in the specification and in the claims hereof refer to a brominated polymer produced by bromination of a pre-existing styrenic polymer such as polystyrene or a copolymer of styrene and at least one other vinyl aromatic monomer, as distinguished from an oligomer or polymer produced by oligomerization or polymerization of one or more brominated styrenic monomers, the properties of the latter oligomers or polymers typically being considerably different from brominated polystyrene in a number of respects.

The processes for preparing brominated polystyrenic polymers described in the foregoing commonly-owned patents teach the desirability of removing coproduct HBr that is usually found in the head space of the bromination reactor by passing such head space vapors into a scrubber, followed by providing a cook period for the bromination reaction mixture to allow bromination to continue to the desired extent, and then terminating the bromination reaction with a suitable aqueous medium. Such an operation is of economic importance since the HBr coproduct is of value either for use as HBr or for conversion to other commercially desirable products, such as bromine itself. In cases where bromine chloride is used as the brominating agent, HCl is formed as a coproduct.

Despite the excellence of such prior technology, new improvements, especially in the manner of conducting the processes, are always welcome. This invention is deemed to provide at least one such new improvement.

BRIEF SUMMARY OF THE INVENTION

This invention enables the valuable bromine values to be recovered from the styrenic polymer bromination reaction mixture in a highly efficient manner. The invention also reduces the capital required for conducting the overall process by eliminating equipment typically used in the plant facilities for scrubbing HX gases vented from the bromination reactor in order to keep HX gas from entering the environment and for absorbing organic solvent vapors from such gas. Further, reaction mixtures formed in a bromination process of this invention can be more readily processed in the plant than corresponding conventional styrenic polymer bromination reaction mixtures in as much as the HX can serve as an additional diluent for the reaction mixture. As used herein, including the claims, and unless expressly stated otherwise, the formula HX denotes HBr or HCl, or both.

In accordance with one embodiment of this invention there is provided a process of preparing a brominated styrenic polymer having a bromine content of at least about 50 wt %, and preferably at least about 60 wt %, and still more preferably at least about 67 wt % by brominating styrenic polymer, wherein said process is characterized by conducting the bromination in a liquid phase reaction mixture under superatmospheric pressure in a closed reaction system so that gaseous HX coproduct is not released from said closed reaction system separately and apart from said reaction mixture. Stated in other terms, the invention of this embodiment is in a process wherein a brominated styrenic polymer having a bromine content of at least about 50 wt %, and preferably at least about 60 wt %, and still more preferably at least about 67 wt % is prepared by brominating styrenic polymer. The improvement in such process comprises conducting the bromination in a liquid phase reaction mixture under superatmospheric pressure in a closed reaction system so that gaseous HX coproduct is not released from said closed reaction system separately and apart from said reaction mixture.

The above embodiment of this invention (in whichever of the two forms in which it is stated above) enables:

A) capture within the bromination reactor of substantially all coproduct HX along with and as a part of the reaction mixture formed in a batch bromination conducted in the closed reaction system; or B) removal of substantially all coproduct HX along with and as a part of the reaction mixture existing after completion of a batch bromination of styrenic polymer conducted in the closed reaction system; or C) removal of substantially all coproduct HX along with and as a part of the reaction mixture being formed in a continuous bromination of styrenic polymer conducted in a closed reaction system.

In each of A), B), and C) the brominated styrenic polymer and the coproduct HX can then be separated and recovered.

In accordance with another embodiment of this invention there is provided a process for the preparation of a brominated styrenic polymer having a bromine content of at least about 50 wt %, and preferably at least about 60 wt %, and still more preferably at least about 67 wt %, said process characterized in that a styrenic polymer is brominated under superatmospheric pressure in the presence of a Lewis acid bromination catalyst and in a closed reaction system in which substantially all of the HX coproduct is retained in the reaction mixture until the catalyst is quenched either in the reaction zone or externally from the reaction zone.

In carrying out the above process, typically the catalyst is quenched in an aqueous quenching medium. Preferably the HX dissolved in the resultant aqueous phase is separated from the organic phase containing the brominated styrenic polymer. In cases where HX is HBr, it is preferred to recover the bromine values in the aqueous phase by (i) steam stripping the aqueous phase to remove residual organic solvent from the aqueous phase and thereby provide a hydrobromic acid product suitable for use or sale; (ii) converting the HBr in the aqueous phase to elemental bromine; or (iii) reacting the HBr with an aqueous metallic base to produce a solution of a metal bromide salt suitable for use or sale.

In a batch bromination process of this invention the liquid reaction mixture comprised of brominated styrenic polymer and substantially all coproduct HX can be quenched in the reaction vessel in which they are formed, or the liquid reaction mixture comprised of brominated styrenic polymer and substantially all coproduct HX can be removed from reaction vessel in which they are formed and quenched in a separate quenching zone. In this latter case the liquid reaction mixture comprised of brominated styrenic polymer and coproduct HX is kept under pressure, preferably in confinement as it is transported within piping, conduits, or the like, extending from the reaction vessel into the separate quenching vessel and released within the body of a liquid quenching medium, preferably an aqueous quenching medium, contained in the quenching vessel so that gaseous HX does not escape into the surroundings.

By "closed reaction system" in connection with a batch process in which the bromination and quenching are to be carried out seriatim in the same reaction vessel is meant that except for piping or conduits carrying the necessary components (including purging carrier gases, liquid quenching medium etc.) into and out of the bromination reaction vessel, the system is closed from its surroundings. In short, the system is designed such that gaseous HX coproduct does not escape from the system, but rather is caused to remain within the confines of the reaction vessel under sufficient pressure so that substantially all of the HX coproduct remains within and is part of the reaction mixture until quenching whereby the HX is captured in the quenching medium concurrently with deactivation of the bromination catalyst. When HX is HBr, the bromine values are then recovered in a suitable form and when HX is HCl, the HCl can be recovered, e.g., as hydrochloric acid, if desired.

By "closed reaction system" in connection with a batch process or continuous process in which the bromination and quenching are to be carried out, or are carried out, in separate vessels or zones is meant that except for piping or conduits carrying the necessary components (including purging carrier gases, if used, etc.) into and out of the bromination reaction vessel or zone and into and out of the catalyst deactivation vessel or zone, the system is closed from its surroundings. In short, the system is designed such that gaseous HX coproduct does not escape from the system, but rather is caused to travel from the bromination reaction vessel or zone into the catalyst deactivation vessel or zone under sufficient pressure so that substantially all of the HX coproduct remains within and is part of the reaction mixture until quenching whereby such coproduct HX is captured in the quenching medium concurrently with deactivation of the bromination catalyst. Here again, when HX is HBr, the bromine values are then recovered in a suitable form, and when HX is HCl, the HCl can be recovered, e.g., as hydrochloric acid, if desired.

By conducting the process in accordance with this invention, brominated styrenic polymer of desired bromine content and substantially all HX coproduct are captured in the same operation (quenching), process equipment costs are reduced, and processing of the reaction mixture is facilitated.

These and other embodiments and features of this invention will be still further apparent from the ensuing description, accompanying drawings and appended claims.

FURTHER DETAILED DESCRIPTION

Figure 1:
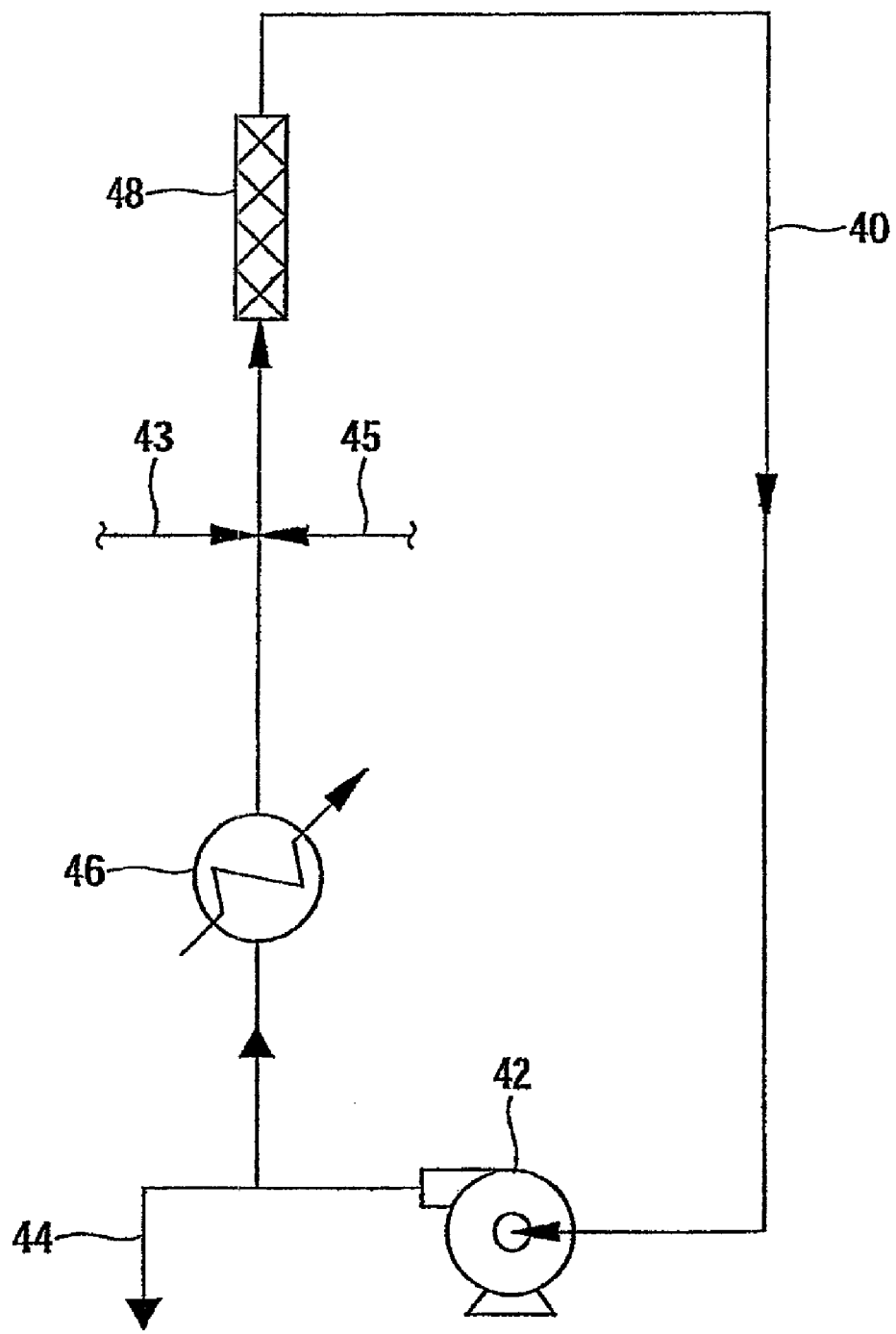
FIG. 1 is a schematic flow diagram of a bromination process of this invention that can be used for producing brominated styrenic polymers.

One of the features of this invention is the fact that the process of this invention can be applied to any process for producing brominated styrenic polymers, including preferably, those of the commonly-owned patents described at the outset of this document.

Thus for example, the process for brominating styrenic polymers can be a process which comprises forming a reaction mixture by feeding a mixture (i) which is substantially free of a bromination catalyst and (ii) which is formed from at least a brominating agent and a styrenic polymer, to a catalytic quantity of a bromination catalyst, this being exemplary of process technology first described in U.S. Pat. No. 5,677,390.

Similarly, the process for brominating styrenic polymers can be a process which comprises feeding a first stream comprising brominating agent, a second stream comprising styrenic polymer and a third stream comprising bromination catalyst to a mixer to intimately mix such streams, this being exemplary of process technology first described in U.S. Pat. No. 5,686,538.

Also, the process for brominating styrenic polymers can be a process which comprises contacting styrenic polymer with a brominating agent in the presence of Lewis acid catalyst and solvent quantities of bromochloromethane, this being exemplary of process technology first described in U.S. Pat. No. 5,767,203.

In each of the above processes described in U.S. Pat. Nos. 5,677,390; 5,686,538; or 5,767,203, such process is improved pursuant to this invention by conducting the bromination in a closed reaction system under superatmospheric pressure which is typically up to about 60 psig, to retain substantially all of the HX coproduct in a bromination reaction mixture, and terminating the bromination by quenching the reaction mixture which comprises brominated styrenic polymer and substantially all of the coproduct HX, in an aqueous quenching medium. Preferably the brominated styrenic polymer and the HX coproduct are separated and recovered from at least a portion of the aqueous quenching mixture formed during the quenching.

In addition to the foregoing, still another process of this invention is a process for brominating styrenic polymers which process comprises concurrently feeding a first stream comprising brominating agent and a bromination catalyst, and a second stream comprising styrenic polymer to a reaction zone wherein:

A) the bromination is conducted in a closed reaction system to retain HX coproduct in a bromination reaction mixture at superatmospheric pressure, and B) the catalyst is deactivated by quenching the reaction mixture which includes the brominated styrenic polymer and substantially all of the HX coproduct, in an aqueous quenching medium.

Preferably the HX dissolved in the resultant aqueous phase is separated from the organic phase containing the brominated styrenic polymer. When HX is HBr, it is preferred to recover the bromine values in the aqueous phase by (i) steam stripping the aqueous phase to remove residual organic solvent from the aqueous phase and thereby provide a hydrobromic acid product suitable for use or sale; (ii) converting the HBr in the aqueous phase to elemental bromine; or (iii) reacting the HBr with an aqueous metallic base to produce a solution of a metal bromide salt suitable for use or sale.

In each of the processes of this invention, the superatmospheric pressure employed can be the autogenous pressure generated in the closed system. However, any superatmospheric pressure within the safe operating limits of the reactor and/or associated pressurized equipment can be used.

HX coproduct is soluble in the halogenated solvents used in the processes of this invention. Thus, in the practice of this invention the HX coproduct is carried through the closed reaction zone while in solution, and in fact serves as an additional diluent thereby reducing the viscosity of the polymeric solution. Such a reduction in viscosity offers the opportunity of operating with less solvent or enabling use of a moderately higher molecular weight of styrenic polymer with the same level of solvent. In addition, the typical need for a scrubbing system for scrubbing HX coproduct from the exit gas stream from the bromination reactor is eliminated. Instead of providing and using such a scrubbing system, all of the HX coproduct can be recovered in a single operation from the contents of an aqueous quenching system used for deactivating the catalyst. Moreover, the capital cost for a scrubbing system and the costs involved in the maintenance of a scrubbing system are eliminated.

Another feature of this invention is that although it might be expected that the bromination reaction rate would be reduced by operating in a closed bromination reaction system so that the HX coproduct remains with the reaction mixture throughout the bromination, it has been found that for all practical purposes the bromination reaction rate appears to be as fast as if the bromination was conducted at atmospheric pressure.

If necessary, the feed streams to the bromination reaction zone can be degassed to remove dissolved atmospheric gases that may be entrained therein. In this way, the possibility of exceeding the pressure limitations of the bromination reaction system being employed is minimized.

Styrenic polymers which are brominated in accordance with the present invention are homopolymers and copolymers of vinyl aromatic monomers, that is, monomers having an unsaturated moiety and an aromatic moiety. The preferred vinyl aromatic monomers have the formula:

$$H_2C=CR-Ar$$

wherein R is hydrogen or an alkyl group having from 1 to 4 carbon atoms and Ar is an aromatic radical (including various alkyl and halo-ring-substituted aromatic units) of from 6 to 10 carbon atoms. Examples of such vinyl aromatic monomers are styrene, alpha-methylstyrene, ortho-methylstyrene, meta-methylstyrene, para-methylstyrene, para-ethylstyrene ethylstyrene, isopropenyltoluene, isopropenylnaphthalene, vinyl toluene, vinyl naphthalene, vinyl biphenyl, vinyl anthracene, the dimethylstyrenes, t-butylstyrene, the several chlorostyrenes (such as the mono- and dichloro-variants), the several bromostyrenes (such as the mono-, dibromo- and tribromo-variants). Polystyrene is the currently preferred styrenic polymer and, when the styrenic polymer being brominated is a copolymer of two or more vinyl aromatic monomers, it is preferred that styrene be one of the monomers and that styrene comprise at least 50 weight percent of the copolymerizable vinyl aromatic monomers.

The styrenic polymers, which are brominated in accordance with the present invention, are readily prepared by bulk or mass, solution, suspension or emulsion polymerization techniques comparable to those employed in the polymerization of styrene. Polymerization can be effected in the presence of free radical, cationic or anionic initiators, such as di-t-butyl peroxide, azo-bis(isobutyronitrile), di-benzoyl peroxide, t-butyl perbenzoate, dicumyl peroxide, potassium persulfate, aluminum trichloride, boron trifluoride, etherate complexes, titanium tetrachloride, n-butyllithium, t-butyllithium, cumylpotassium, 1,3-trilithiocyclohexane, and the like. The polymerization of styrene, alone or in the presence of one or more monomers copolymerizable with styrene, is well known and it is considered unnecessary to further discuss the polymerization process. Styrenic polymers produced by free radical polymerization with GPC molecular weights of at least 1,000, preferably at least 50,000 and most preferably 150,000 to 500,000, are brominated in accordance with the present invention. Anionic styrenic polymers (i.e., styrenic polymers formed using an anionic initiator) having a GPC number average molecular weight in the range of about 2000 to about 30,000, preferably in the range of about 2000 to about 10,000 and more preferably in the range of about 3000 to about 7000 constitute another preferred type of styrenic polymers for use in this invention. Although styrenic polymers outside these molecular weight ranges can be brominated in accordance with the present invention, there is typically no economic advantage in so doing.

The catalyst used in the processes of this invention can be any bromination catalyst, provided that the catalyst does not act to frustrate the efficient and safe production of a high quality brominated polystyrenic product. The favored catalysts are the Lewis acid catalysts which are typified by $AlCl_3$, $FeCl_3$, $AlBr_3$, $FeBr_3$, $SbCl_5$, $ZrCl_4$, and the like. Fe, Al and $Sb_2O_3$ may be used to form Lewis acid catalysts by simply adding them to the reaction system. Mixtures of catalyst can also be used. Once the catalyst has been added to the reaction system, it may undergo some reaction without significant loss of catalytic activity, e.g., $AlCl_3$ may convert to some extent to $AlBr_3$. The more preferred catalysts are the aluminum and iron-based catalysts. Of these, more preferred are the aluminum and iron halides, especially the bromides and chlorides, such as $AlCl_3$ and $AlBr_3$ are highly preferred. When bromine ($Br_2$) is used as the brominating agent, most preferred as catalyst are the bromides such as $AlBr_3$ or $FeBr_3$ that show excellent activity for aromatic bromination and do not provide a source of HCl that could contaminate the anhydrous HBr coproduct stream and reduce its high value. Also highly preferred is a catalyst solution prepared by combining solid $AlCl_3$ (a substance which is not soluble in bromine) and gaseous HBr in warm (40-50° C.) liquid bromine. A rapid halogen exchange produces a soluble bromoaluminum halide catalyst and HCl and the catalyst can be used with or without copresence of HCl. An advantage of using a catalyst of this type is that the active brominating species (believed to be the bromonium ion, $Br^+$) is preformed, and thus the bromination of the styrenic polymer initiates very rapidly and with high selectivity. The direct addition of $AlBr_3$ to bromine also produces a solution of this preferred preformed brominating species.

The catalyst is used in an amount which is sufficient to obtain the catalytic effect sought. These catalytic amounts will depend on the activity of the catalyst, but will generally fall within the range of from about 0.2 to about 20 weight percent and preferably within the range of from about 0.5 to about 15 weight percent, based on the weight of the styrenic polymer being brominated. The most active catalysts will be used in the lower amounts while the less active catalysts will be used in the higher amounts. For the preferred aluminum and iron-based catalysts, it is preferred that they be used in amounts within the range of from about 0.5 to about 5 weight percent. $AlCl_3$ and $FeCl_3$ are useful in amounts within the range of from about 0.2 to about 10 weight percent. When $AlCl_3$, $AlBr_3$, or a catalyst solution made from solid $AlCl_3$ and gaseous HBr in warm liquid bromine as described above is used as the catalyst, amounts within the range of from about 0.5 to about 3 weight percent are preferred.

The brominating agents useful in the process of this invention can be any of those which can brominate aromatic carbons in the aromatic groups of the polymer (hereinafter also referred to as styrenic monomer units). The art recognizes $Br_2$ and BrCl as good brominating agents, with the former being more preferred. Bromine can be obtained commercially in the diatomic form or can be generated by the oxidation of HBr. $Br_2$ can be supplied either as a liquid or a gas. The amount of brominating agent used in the process should provide an overall mole ratio of total brominating agent to total styrenic polymer fed, which will provide from 1 to 3 bromine substitutions per styrenic monomer unit in the polymer. Generally, it is desired that the brominated styrenic polymer products of this invention contain at least 30 wt % bromine, based upon the total weight of the brominated polymer. It is preferred that the brominated polymer contain above about 50 wt % bromine and most preferably above about 60 wt % bromine. For any particular styrenic polymer, the amount of brominating agent used in the process will be determined by the bromine content desired considering the highest bromine content which is obtainable with the process parameters chosen. The higher bromine contents will require the most brominating agent. It is pointed out that as tribromination is approached, it becomes more difficult to substitute more bromines. Adding ever larger amounts of a brominating agent does not always reduce this difficulty. However, it is helpful, in attempting to maximize the bromine content, to provide a small stoichiometric excess of brominating agent. Stoichiometric excesses up to about 2% are preferred. The stoichiometry is easily determined as it requires one mole of $Br_2$ or BrCl per substitution sought. In practice, the practitioner will determine the bromine content sought on a weight basis and then will calculate, on an idealized basis, the number of moles of brominating agent needed to obtain the same. For example, if the styrenic polymer is polystyrene and the bromine content sought is 68 wt %, at least 2.7 moles of bromine or BrCl per styrenic monomer unit will be required, not including any desired stoichiometric excess. For brominated polystyrene, a bromine content of from about 40 to about 70+wt % bromine is desirable. This range can be theoretically obtained with a mole ratio of bromine to styrenic monomer unit of from about 0.9:1 to about 3.0:1. Preferred for brominated polystyrene is a bromine content of from about 60 to about 70+wt %, which can be obtained with a theoretical mole ratio of from about 1.9:1 to about 3.0:1 for bromine or BrCl. The processes of this invention can, with facility, provide up to 67-69 wt % and in fact even up to 70-72 wt % bromine in the brominated styrenic polymer. In determining the amount of brominating agent in the process, the brominating agent in the feed mixture and any brominating agent pre-added prior to the feed of the mixture are both counted. As pointed out herein, it is not necessary to pre-add a brominating agent to the catalyst and, thus, all of the process brominating agent requirements can be supplied via the feed of the mixture. If, however, the practitioner chooses to pre-add a brominating agent to the reactor, it can be done. While the foregoing describes the overall quantitative relationship between the brominating agent and styrenic polymer, the quantitative relationship between these two reactants in the feed mixture has not been fully discussed. Generally, the mixture which is to be fed will contain from about 1 to about 8 moles of brominating agent per mole of styrenic monomer units at any time during the feed period. During the feed, the quantitative relationship can be constant or can vary within the above-mentioned range. (It is within the scope of this invention to allow for some excursions outside of the range so long as such does not do significant harm to the process efficiency or to product quality.) A preferred range is from about 2.5 to about 5 moles of brominating agent per mole of styrenic monomer units in the feed mixture. As can be appreciated, the use of an amount of brominating agent in the feed mixture which gives a mole ratio of brominating agent to styrenic monomer units which is less than or greater than the selected overall mole ratio of brominating agent to styrenic monomer units, will result in exhaustion of either the brominating agent or the styrenic polymer as a mixture constituent before exhaustion of the other constituent. For example, if the practitioner chooses to produce brominated polystyrene with a 70 wt % bromine content, an overall molar ratio of bromine to styrenic monomer units of 3.0:1, and any excess if desired, would be suitable. If the practitioner chooses to form a feed mixture in which the molar ratio of bromine to styrenic monomer units is 1:1, it can be seen that the amount of polystyrene to be fed will be completed before obtaining the needed overall amount of bromine. In this case, the practitioner first uses the 1:1 mixture and then continues on with just a bromine feed after the polystyrene feed has been exhausted. If, on the other hand, the molar ratio in the feed mixture is chosen to be 5:1, then the bromine will first become exhausted and the feed will have to be finished with the polystyrene alone. Generally, it is preferred to have the overall molar ratio and the feed mixture ratio at least somewhat similar. In all cases though, the initial feed should preferably contain at least a molar ratio of bromine to styrenic monomer units of 1:1.

It is preferred that the bromine used in the process of this invention be essentially anhydrous, i.e., contain less than 100 ppm (weight basis) water and contain no more than 10 ppm organic impurities, e.g., oil, grease, carbonyl containing hydrocarbons, iron, and the like. Available, commercial grade bromine may have such purity. If, however, such is not available, the organic impurities and water content of the bromine can be conveniently reduced by mixing together a 3 to 1 volume ratio of bromine and concentrated (94-98 percent) sulfuric acid. A two-phase mix is formed which is stirred for 10-16 hours. After stirring and settling, the sulfuric acid phase, along with the impurities and water, is separated from the bromine phase. To further enhance the purity of the bromine, the recovered bromine phase can be subjected to distillation.

As before stated, it is preferred that the processes of this invention use a solvent. The solvent must be capable of solubilizing the styrenic polymer feed and underbrominated intermediates and be relatively inert to the process at reaction conditions. The solvent should also exhibit solubility of the underbrominated styrenic polymers and, in preferred cases, the final brominated product. Preferred solvents are those in which the bromination catalyst is also soluble, readily dispersed or readily suspended. Halogenated solvents are preferred and are exemplified by carbon tetrachloride, chloroform, tetrachloroethane, methylene chloride, dichloroethane, trichloroethylene, trichlorobenzene, methylene bromide, 1,2-dibromoethane, dichlorodifluoromethane, bromochloromethane, and mixtures thereof. Especially preferred are bromochloromethane, 1,2-dichloroethane, methylene bromide, and methylene chloride. By forming a solution of solvent and styrenic polymer, the polymer becomes easy to handle and mix with bromine. The solutions of this invention preferably contain from about 5 to about 50 wt % polymer. More highly preferred are those which contain from about 5 to about 30 wt % polymer.

It is preferred to have the bromination catalyst, to which the bromine/styrenic polymer mixture is fed, to be in association with a liquid so that the catalyst can be in a solution, slurry, dispersion or suspension. Such will enhance mixing of the reactants and mass transfer qualities. It is expedient, but not necessary, to use the same liquid, i.e., solvent, that is used to form the styrenic polymer solution. Thus, in one preferred mode, processes of this invention will provide a mixture of halogenated solvent and catalyst in the reactor into which the styrenic polymer/brominating agent mixture can be fed. The mixture of halogenated solvent and catalyst is best described as a suspension. Generally, it is suitable to use from about 95 to about 99.9 wt % liquid and preferably from about 99 to about 99.8 wt %, based on the total weight of liquid and catalyst. In a second more preferred mode, the catalyst is dissolved or suspended in the brominating agent and then combined with the styrenic polymer solution as it enters the reaction zone.

The solvent used to dissolve the styrenic polymer and the liquid used in association with the catalyst are preferably dry, that is, they contain less than about 200 ppm (weight basis) water between them and preferably less than about 150 or 100 ppm water. The presence of water is not desired as, in significant quantities, it can deactivate the catalyst to an undesirable extent. If, for some reason, the practitioner has large amounts of water in the process and dewatering is not practical, then it may be possible to overcome the situation by simply increasing the amount of catalyst used. For the process of this invention, it is not a feature to solely use water to avoid cross-linking as is taught in U.S. Pat. No. 4,200,703, but rather, this invention minimizes cross-linking by means which include its novel feeding techniques.

The styrenic polymer/brominating agent mixture feed should occur expeditiously, with consideration being given to the ability of the process equipment to handle the heat load from the exothermic process, the pressure generated by the HX coproduct, and other process concerns. In short, the feed can occur over the shortest time period that will be allowed by the equipment without excursion outside of critical process parameters. Generally, it is anticipated that the feed period for batch operations will be from 0.5 to 10 hours for a commercial-size plant. Shorter feed periods are expected for smaller scale batch processes. Average residence times for continuous processes of this invention (i.e., periods between the time initiation of bromination occurs in the reaction zone until deactivation of the catalyst occurs) are typically less than 20 minutes, preferably 10 minutes or less, and more preferably 5 minutes or less.

The process of this invention occurs at a temperature in the range of about $-20°$ to about $20°$ preferably in the range of about $-10$ to about $10°$ C., and more preferably in the range of about $-5°$ C. to about $5°$ C. The bromination and preferably the transfer to the aqueous quenching medium are conducted at superatmospheric pressure. Less preferred is to reduce the pressure at commencement or during the transfer of reactor contents to the aqueous quenching medium, while keeping all of the reactor contents including the HX confined, e.g., within transfer piping or conduits so that substantially all of the HX coproduct formed in the bromination is kept confined, and transferred to and captured by the quenching medium.

To carry out a typical batch-type process of this invention, a bromination catalyst, e.g., $AlCl_3$, is suspended in essentially anhydrous solvent, to give an easily stirrable suspension. The suspension is prepared in a glass-lined, stirred reactor and brought to a temperature within the range of from about $-5°$ to about $10°$ C. The mix is kept under a pressurized, inert, dry atmosphere in the reactor. A solution of a styrenic polymer and solvent, e.g., bromochloromethane, is prepared and intimately mixed with a bromine stream to yield a homogenous mixture. The cool mixture is fed into the stirred bromination catalyst suspension in the sealed pressurized reactor. The intimate mixing of the styrenic polymer solution and brominating agent can be accomplished in a number of ways. For example, the solution and a brominating agent can be fed to a mixing device, e.g., a mixing nozzle, at the lower end of the dip tube in the reactor which extends to a point below the suspension level. The mixing device is designed to obtain the intimate mixing of the solution and brominating agent. Also, the mixing device acts to impart mixing energy, at the point of feed, to the intimate mixture and catalyst suspension. Another technique for obtaining intimate mixing of the styrenic polymer solution and brominating agent, is to use an exterior reactor loop having an in-line mixer, say an impingement mixer. Generally, the use of an exterior reactor loop includes first charging the reactor with a bromination catalyst slurry, suspension, etc., and then withdrawing from the reactor a stream which is then fed to a mixer external of the reactor. A mixture formed from at least bromine and styrenic polymer is also fed to the mixer to yield a second mixture which is formed from the two feeds to the mixer. The second mixture is subsequently fed back to the reactor. The stream withdrawn from the reactor will initially comprise the catalyst. After the second mixture is fed to the reactor and the process runs, the withdrawn stream will begin to comprise brominated polystyrene along with catalyst. Use of an exterior reactor loop in a bromination process is further discussed with reference to FIG. 1 of U.S. Pat. No. 5,677,390.

The reactor is kept at a low temperature, e.g., from about $0°$ to about $-5°$ C., during the feed of the styrenic polymer and/or brominating feed, as the case may be, and preferably from about $-2°$ to about $2°$ C.

As can be appreciated, the contents of the sealed, pressurized batch reactor change in composition during the bromine and polystyrene/solvent solution feeds. Initially, the contents of the reactor comprise catalyst and solvent. As the process runs, the reactor contents comprise and begin to become more rich in brominated polystyrene. During a cook period, bromination of the last styrenic polymer fed to the reactor occurs. Removal of the reactor contents can continue to occur during the cook period to aid in mixing.

After the feed has been accomplished in such batch-type operation, the reaction mixture which includes substantially all of the HX coproduct is maintained in the sealed reactor under superatmospheric pressure for a cook period of from about 5 to about 30 minutes, and preferably from about 5 to about 15 minutes. The cook temperature is within the range of from about $-10°$ to about $10°$ C. and preferably within the range of from about $-5°$ to about $5°$ C. The cook period serves to complete the bromination of the last of the styrenic polymer fed to the reactor. The cook period can occur in the reactor.

Bromination of styrenic polymers is a substitution reaction. Coproduct HX is also formed in this reaction. In the practice of the present invention, the HX formed in the process is kept within the reactor and discharged along with the reaction mixture into an aqueous quenching bath or zone. A dry, inert gas, e.g., nitrogen, can be used as a carrier gas to purge the HX vapors from the reactor into an aqueous quenching bath or into a quenching zone equipped with aqueous sprays to dissolve substantially all of the vaporous HX. The aqueous quenching bath or the sprays in the quenching zone may contain a salt-forming base such as sodium hydroxide so that the HX entrained in the reaction mixture and the HX purged from the vapor state are converted into a water-soluble dissolved salt such as an alkali metal salt, typically NaBr or NaCl. Preferably, only water is used for the quench so that the hydrobromic acid or hydrochloric acid solution that is formed is suitable for use or sale after removal of any small quantities of retained bromination solvent.

While pure water is the preferred aqueous quenching medium, a solution or slurry of sodium sulfite, and/or sodium hydroxide can be used to deactivate the catalyst, kill any remaining brominating agent and to adjust the reaction mixture pH. After such treatment, the quenched reaction mixture is settled to obtain a two-phase reaction mixture containing an organic phase, which contains, as a solute, the brominated styrenic polymer product, and an aqueous phase which contains most, if not all, of the HX coproduct. The aqueous phase is decanted and the remaining organic phase is stripped of its solvent component. It is most convenient to accomplish this strip by pumping the organic phase into boiling water. As the solvent is flashed off, the brominated styrenic polymer product forms a precipitate. The precipitate can be recovered by any liquid-solid separation technique, e.g., filtration, centrifugation, etc. The recovered precipitate is then dried. The aqueous phase from the quench which includes the HX coproduct is treated with live steam in either a batch or continuous operation to remove any residual bromination solvent. When bromine ($Br_2$) is used as the brominating agent, the steam stripped aqueous solution may then be sent to a bromine recovery unit where the bromine value is recovered as elemental bromine, or if pure water was used for the quench, the solution is suitable for use or sale as hydrobromic acid. Alternatively, the stripped aqueous solution can be treated with a metallic base in order to form a solution of metallic bromide salt suitable for use or sale.

To carry out a process of this invention as a typical continuous process, typically two or three continuous feeds of the reactor components are carried out concurrently, the reactor or reaction zone is preferably a tubular or loop-type reactor, and contents from the reactor are typically continuously removed from the reaction zone and transferred to a quenching bath or quenching zone. When two continuous feeds are used, neither feed contains all three of the components for a period of time greater than a few seconds, viz., (1) brominating agent, (2) catalyst, and (3) styrenic polymer (preferably dissolved in a solvent), but all three of these are fed by combining two of these three components in a one of the two feeds. If in such case (3) is fed neat, the solvent should be fed either with the brominating agent and the catalyst or a third feed of solvent should be used. When three feeds are used each of (1), (2), and (3) can be fed separately but a portion of any one of them can be combined with a feed of (1), (2) and/or (3) provided no feed contains all three of them for a period of time greater than a few seconds. Permissible combination of all three feeds for a period of time not greater than a few seconds can arise, for example, when the three components enter a small impingement mixing chamber in an injector and then are injected from the injector. In such a case the impingement mixing chamber an exit passage therefrom constitute part of the reaction zone.

Multiple feeds of components (1), (2) and/or (3) can be employed, if desired.

The flow diagram of FIG. 1 schematically depicts one type of system that can be used for conducting a continuous process pursuant to this invention involving continuous bromination of anionic styrenic polymer (i.e., styrenic polymer formed by use of an anionic polymerization initiator such as a lithium alkyl). Basically the system is composed of a loop type reactor 40, a pump 42 for circulating the reaction mixture including the HX coproduct through reactor 40, a take-off line 44 for receiving from reactor 40 a portion of the circulating reaction mixture including HX coproduct and transmitting such contents to a quench vessel (not shown), a dual injection system composed of injector 43 and injector 45, an indirect heat exchanger 46, and a static mixer 48. In the form depicted heat exchanger 46 is disposed upstream from injectors 43 and 45 and downstream from pump 42 so as to remove heat generated by the action of pump 42, as well as heat from the exothermic bromination reaction. If desired, heat exchanger 46 can be placed at any other suitable place relative to reactor 40. Also more than one such heat exchanger can be employed in association with reactor 40 to remove heat at more than one location around the loop. Heat exchanger 46 is provided with a flow of suitable heat absorbing liquid such as cooling water and/or ethylene glycol.

As depicted, injectors 43 and 45 are in axial opposed alignment. Though not shown in the line drawing of FIG. 2, the orifices of injectors 43 and 45 are spaced apart from each other so that the contents of these respective injectors are forced directly toward each other and substantially at right angles relative to and into the reaction mixture including the HX coproduct flowing through reactor 40. Such an arrangement ensures very rapid contacting among the injected contents from the injectors and the reaction mixture flowing through the reactor. This in turn ensures highly rapid initiation of the bromination reaction. Take-off line 44 as depicted continuously removes from reactor 40 a portion of the circulating reaction mass. The contents of take-off line 44 are typically transported to and discharged into a vessel (not shown) containing a quenching liquid which promptly deactivates the catalyst.

Injector 43 receives and discharges a solution of anionic styrenic polymer in a suitable solvent whereas injector 45 receives and discharges a mixture of brominating agent such as bromine, and catalyst such as aluminum tribromide. If desired, three injectors (not shown) can be disposed around reactor 40, one for injecting solution of anionic styrenic polymer, another for injecting brominating agent (with or without solvent or diluent) and the third for injecting catalyst (with or without solvent or diluent) so that contact among the three injected streams occurs rapidly thus resulting in rapid initiation of bromination of styrenic polymer. In such a three-injector system the three injectors can be in any disposition relative to each other provided the injected contents from the injectors come into contact with each other rapidly, preferably within a matter of a few seconds. One such three injector arrangement involves disposing the injectors around reactor 40 with the respective axes of the three injectors in the same plane and radially spaced at about 120° intervals.

The system of FIG. 2 is typically operated at superatmospheric pressure. Accordingly, the HX coproduct remains with the reaction mixture within the confines of reactor 40 and is carried out of the reactor via take-off line 44 and is discharged along with the reaction mixture directly into a vessel containing an aqueous quenching medium which takes up the HX and prevents its escape into the environment. Thus substantially all of the HX coproduct is captured at the same time the reaction mixture is quenched, a step leading to recovery of both products in commercially desirable forms.

Product recovery and workup after quenching can be conducted by letting the quenched reaction mixture settle to obtain a two-phase reaction mixture containing an organic phase, which contains, as a solute, the brominated anionic styrenic polymer product and an aqueous phase containing the HX coproduct. The aqueous phase is decanted and the remaining organic phase is stripped of its solvent component. It is most convenient to accomplish this strip by pumping the organic phase into boiling water. As the solvent is flashed off, the brominated anionic styrenic polymer product forms a precipitate. The precipitate can be recovered by any liquid-solid separation technique, e.g., filtration, centrifugation, etc. The recovered precipitated washed product is then dried, typically at a temperature in the range of bout 110 to about 150° C.

The aqueous phase from the quench is treated with live steam in either a batch or continuous operation to remove any residual bromination solvent. When HX is HBr, the steam stripped aqueous solution may then be sent to a bromine recovery unit where the bromine value is recovered as elemental bromine, or if pure water was used for the quench, the solution is suitable for use or sale as hydrobromic acid.

When using bromine as the brominating agent and operating the system of FIG. 1 at elevated pressures in the order of about 20 to about 60 psig and preferably at about 45 psig, all of the HBr coproduct formed can be retained in the liquid reaction mixture. This has the advantage not only of eliminating a need for a separate HBr scrubber from the overall system, but in addition all of the bromine values in the HBr can be recovered from the aqueous quench of the reaction mixture thus simplifying and reducing the cost of the recovery of such bromine values. Further, the retained HBr has a diluent effect on the reaction mixture that reduces the viscosity of the reaction mixture. Such reduced viscosity enables the bromination process to operate with less solvent or enable use of a moderately higher molecular weight anionic styrenic polymer with the same level of solvent or allow use of a smaller, less costly heat exchanger.

Brominated styrenic polymers produced by this invention can be used as flame retardants for various polymeric materials such as thermoplastic and thermosetting polymeric materials and resins. The weight average molecular weights of the polymers that can be flame retarded pursuant to this invention can vary widely, from low molecular weight polymers to very high molecular weight polymers. Methods for producing the various thermoplastic or thermosetting polymers that can be flame retarded with the brominated styrenic polymers of this invention are known to those of ordinary skill in the art. Other persons who may be unfamiliar with such matters, should refer to the extensive literature that exists on such subjects. Preferably the brominated styrenic polymers of this invention are used as additive flame retardants for various thermoplastic polymers.

As used anywhere herein including the claims, the terms "continuous" and "continuously" denote that the operation referred to ordinarily proceeds without interruption in time provided however that an interruption is permissible if of a duration that does not disrupt steady-state conditions of that operation. If the interruption is of a duration that disrupts steady-state operation, a steady state condition of operation should be achieved before resuming collection of the product.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what preliminary chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A process wherein a brominated styrenic polymer having a bromine content of at least about 50 wt % is prepared by brominating styrenic polymer, wherein said process is characterized by brominating the styrenic polymer in a liquid phase reaction mixture under superatmospheric pressure in a closed reaction system so that gaseous HX coproduct is not released from said closed reaction system separately and apart from said reaction mixture.

2. A process as in claim 1 wherein the bromination is conducted using bromine, $Br_2$, as brominating agent so that said gaseous HX is HBr.

3. A process as in claim 2 wherein said bromine content is at least about 60 wt %.

4. A process as in claim 2 wherein said bromine content is at least about 67 wt %.

5. A process for the preparation of a brominated styrenic polymer having a bromine content of at least about 50 wt %, said process characterized in that a styrenic polymer is brominated under superatmospheric pressure in the presence of a Lewis acid bromination catalyst and in a closed reaction system in which substantially all of the HX coproduct is retained in the reaction mixture until the catalyst is quenched either in the reaction zone or externally from the reaction zone.

6. A process as in claim 5 wherein the catalyst is quenched in an aqueous quenching medium.

7. A process as in claim 6 wherein brominated styrenic polymer and HX are separated and recovered from at least a portion of the aqueous quenching mixture formed during the quenching.

8. A process as in claim 5 wherein the bromination is conducted in a solvent which solubilizes the styrenic polymer.

9. A process as in claim 8 wherein said solvent comprises at least one aliphatic halocarbon and/or halohydrocarbon solvent in which the halogen atoms are chlorine atoms, bromine atoms or both.

10. A process as in claim 9 wherein said solvent comprises bromochloromethane.

11. A process as in any of claims 5-10 wherein the Lewis acid catalyst is an aluminum halide in which the halogen atoms are bromine, chlorine or both.

12. A process as in any of claims 5-10 wherein bromination is effected with bromine, bromine chloride, or both, as brominating agent.

13. A process as in claim 12 wherein bromine is used as the brominating agent.

14. A process as in any of claims 5-10 wherein the styrenic polymer is a styrenic polymer formed by free radical polymerization.

15. A process as in claim 14 wherein the styrenic polymer is polystyrene.

16. A process as in any of claims 5-10 wherein the styrenic polymer is a styrenic polymer formed by anionic polymerization.

17. A process as in claim 16 wherein the styrenic polymer is polystyrene.

18. A process as in claim 5 wherein:
  A) bromination is conducted with bromine, bromine chloride, or both, as brominating agent;

B) bromination is conducted in a solvent which solubilizes the styrenic polymer; and C) brominated styrenic polymer and HX are separated and recovered from at least a portion of the aqueous quenching mixture formed during the quenching.

19. A process as in claim 18 wherein the styrenic polymer is a styrenic polymer formed by free radical polymerization or by anionic polymerization.

20. A process as in claim 19 wherein the styrenic polymer is polystyrene.

21. A process as in claim 5 wherein in conducting the bromination, a mixture (i) which is substantially free of a bromination catalyst and (ii) which is formed from at least a brominating agent and a styrenic polymer is fed to a catalytic quantity of a bromination catalyst contained in said closed reaction system.

22. A process as in claim 5 wherein a first stream comprising brominating agent, a second stream comprising styrenic polymer and a third stream comprising bromination catalyst are fed to a mixer disposed in said closed reaction system to intimately mix such streams.

23. A process as in claim 5 wherein a first stream comprising brominating agent and catalyst, and a second stream comprising styrenic polymer are fed into said closed reaction system.

\* \* \* \* \*